United States Patent
Muhammed et al.

(10) Patent No.: US 7,485,599 B2
(45) Date of Patent: Feb. 3, 2009

(54) OXYGEN STORAGE MATERIAL, PROCESS FOR ITS PREPARATION AND ITS APPLICATION IN A CATALYST

(75) Inventors: Mamoun Muhammed, Djursholm (SE); Othon Adamopoulos, Stockholm (SE); Tassilo Bog, Hanau (DE); Lothar Mussmann, Offenbach (DE); Dieter Lindner, Hanau (DE); Martin Votsmeier, Martin (DE); Matthias Feger, Darmstadt (DE); Egbert Lox, Hochwaldhausen (DE); Thomas Kreuzer, Karban (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 11/784,622

(22) Filed: Apr. 9, 2007

(65) Prior Publication Data

US 2007/0191220 A1 Aug. 16, 2007

Related U.S. Application Data

(63) Continuation of application No. 11/263,353, filed on Oct. 31, 2005, now Pat. No. 7,202,194, which is a continuation of application No. 10/389,834, filed on Mar. 17, 2003, now abandoned.

(51) Int. Cl.
*B01J 23/02* (2006.01)
*B01J 23/10* (2006.01)

(52) U.S. Cl. .................. 502/304; 502/302; 502/303; 502/324; 502/325; 502/340; 502/343; 502/345; 502/349; 502/350; 502/353

(58) Field of Classification Search ............... 502/302, 502/303, 304, 324, 325, 340, 343, 345, 349, 502/350, 353
See application file for complete search history.

(56) References Cited

U.S. PATENT DOCUMENTS

| | | | |
|---|---|---|---|
| 4,714,694 A | 12/1987 | Wan et al. | |
| 4,940,685 A | 7/1990 | Sauvion et al. | |
| 5,712,218 A * | 1/1998 | Chopin et al. | 502/304 |
| 5,837,642 A * | 11/1998 | Tanaka et al. | 502/304 |
| 5,888,464 A | 3/1999 | Wu et al. | |
| 5,958,827 A * | 9/1999 | Suda et al. | 502/304 |
| 6,040,265 A * | 3/2000 | Nunan | 502/242 |
| 6,107,240 A | 8/2000 | Wu et al. | |
| 6,133,194 A * | 10/2000 | Cuif et al. | 502/162 |
| 6,150,288 A | 11/2000 | Suzuki et al. | |
| 6,228,799 B1 * | 5/2001 | Aubert et al. | 502/304 |
| 6,235,270 B1 | 5/2001 | Ishii et al. | |
| 6,255,242 B1 * | 7/2001 | Umemoto et al. | 501/103 |
| 6,306,794 B1 | 10/2001 | Suzuki et al. | |
| 6,458,741 B1 * | 10/2002 | Roark et al. | 502/303 |
| 2002/0032123 A1 * | 3/2002 | Shigapov et al. | 502/304 |
| 2002/0042342 A1 | 4/2002 | Mussmann | |
| 2002/0090512 A1 * | 7/2002 | Hatanaka et al. | 428/402 |
| 2002/0132732 A1 | 9/2002 | Brenzy et al. | |
| 2003/0050189 A1 * | 3/2003 | Morikawa et al. | 502/304 |
| 2004/0186016 A1 * | 9/2004 | Bog et al. | 502/304 |

FOREIGN PATENT DOCUMENTS

| | | |
|---|---|---|
| EP | 0 207 857 | 6/1986 |
| EP | 0 251 752 | 6/1987 |
| EP | 0 605 274 | 12/1993 |
| EP | 0 827 775 A1 | 8/1997 |
| EP | 1 206 965 | 11/2001 |
| JP | 0 347 952 | 6/1999 |
| WO | WO 98/47476 | 3/1998 |
| WO | WO 02/34371 * | 5/2002 |

OTHER PUBLICATIONS

Search Report, European Patent Office, dated Sep. 16, 2003, for Application Serial No. 03005493.6 (6 pages).
R. Di Monte, P. Fornasiero, J. Kaspar, M. Graziani, J. M. Bernal, A. Gomez-Herrero, "Stabilisation of Nanostructured Ce0.2Zr0.8O2 solid solution by Impregnation on Al2O3 a suitable method for the production of thermally stable oxygen storage/release promoters for three-way catalysts," J. Chem. Soc. Chem. Commun. 2000, p. 2167-2168.
B. Djuricic, S. Pickering, D. McGarry, P. Tambuyser, P. Thomas, "Preparation and properties of alumina-ceria nano-nano composites," J. Mater. Sci., 1999, 34(8), p. 1911-1919.
O. Adamopoulos, Y. Zhang, M. Croft, I. Zakharchenko, T. Tsakalakos, M. Muhammed, "The characterization and reactivity of nanostructured cerium-copper-oxide composites for environmental catalysis," Mat. Res. Soc. Symp. Proc., vol. 676, 2001.
A.E.C. Palmquist, M. Wirde, U. Gelius, M. Muhammed, "Surfaces of doped nanophase cerium oxide catalysts," Nanostructured Materials 1999, vol. 11 (8) p. 995-1007.

* cited by examiner

*Primary Examiner*—Elizabeth D Wood
(74) *Attorney, Agent, or Firm*—Kalow & Springut LLP (57) ABSTRACT

An oxygen storage material comprising cerium oxide and at least one second oxide of a metal $M^1$ is disclosed as well as a process for manufacturing the material and the use of this material in an exhaust gas cleaning catalyst. In a preferred embodiment the oxygen storage material comprises particles from a Ce/$M^1$ mixed oxide solid solution coated with an oxide of another metal $M^2$. Metal $M^1$ e.g. can be calcium or zirconium while metal $M^2$ most preferably is aluminum.

7 Claims, 5 Drawing Sheets

OXYGEN STORAGE MATERIAL, PROCESS FOR ITS PREPARATION AND ITS APPLICATION IN A CATALYST

CROSS REFERENCE TO RELATED APPLICATIONS

This application is a continuation of U.S. patent application Ser. No. 11/263,353, filed Oct. 31, 2005 now U.S. Pat. No. 7,202,194, which is a continuation of U.S. patent application Ser. No. 10/389,834, filed Mar. 17, 2003 now abandoned, which application is incorporated herein by reference.

FIELD OF THE INVENTION

The present invention relates to an oxygen storage material (OSC) on the basis of cerium oxide, a process for producing the same and its application in a catalyst for exhaust gas aftertreatment. The oxygen storage material of the present invention contains cerium oxide, at least one second metal oxide and, preferably, a further metal oxide. The oxides have a very fine particle size, a high resistance against sintering and a high oxygen storage and release capacity.

The oxygen storage materials of the present invention can be employed as a catalyst or catalyst component for purifying exhaust gases of internal combustion engines, especially of stoichiometrically operated otto engines. The catalyst according to the present invention shows excellent activity for purifying harmful pollutants like carbon monoxide, nitrogen oxides and hydrocarbons.

BACKGROUND OF THE INVENTION

Automotive exhaust gases consist mainly of carbon monoxide (CO), hydrocarbons (HC) and various nitrogen oxides (NOx) as pollutants. In order to remove these undesirable compounds, catalytic converters have been employed which have more or less catalytic activity for the simultaneous oxidation of CO and HC and reduction of NOx. The conversion of the pollutants is performed preferably under stoichiometric conditions, which means that the oxidizing and reducing constituents of the exhaust gas are just balanced so that oxidation of CO and HC and reduction of NOx to harmless carbon dioxide, water and nitrogen can be performed simultaneously. For conventional fuels the oxygen content of the exhaust gas under stoichiometric condition is around 0.7 vol.-%.

The $\lambda$-value is defined as the air/fuel ratio (A/F) of the exhaust gas normalized to stoichiometric conditions. The air/fuel ratio for stoichiometric combustion of conventional gasoline and diesel fuels is approximately 14.7 which means that 14.7 kilograms of air are needed to burn 1 kilogram of fuel completely. The $\lambda$-value at this point is $\lambda=1$. Depending on the load and revolution, common gasoline engines usually operate with periodic fluctuations at $\lambda$-values around $\lambda=1$. This can be achieved by a so-called lambda-sensor control. For this application, so-called three-way catalysts are widely used for exhaust gas aftertreatment.

Three-way catalysts comprise a heat resistant carrier formed of cordierite or metal, a high surface area catalyst support, e.g. $\gamma$-alumina, and at least one precious metal element of the platinum group elements which is supported on the catalyst support. In order to enhance the conversion level of oxidizable compounds, an oxygen storage material on the basis of cerium oxide is used.

Oxygen storage materials are able to store oxygen in oxidizing atmosphere or release oxygen under reducing conditions, respectively. The storage and release of oxygen is associated with a change of the oxidation state of $Ce^{3+}$ to $Ce^{4+}$ and vice versa. The amount of oxygen uptake or release as well as the adsorbing/desorbing kinetics under dynamic exhaust conditions are strongly dependent on the chemical composition, synthesis conditions and structural parameters of a given material.

In the future, more stringent exhaust emission regulations will lead to an increased demand for oxygen storing materials with improved oxygen storage capacity as well as higher thermal stability. Particularly, so-called close-coupled catalytic converters, which are positioned close to the engine, may reach temperatures up to 1100° C. when the engine runs under full load. Under these severe conditions the primary particles of the oxygen storing materials usually tend to sinter to form larger agglomerates that lead to a loss of surface area as well as oxygen storage capacity, and thus result in a decrease of catalyst purifying activity.

It is known in the art that impregnating bulk ceria or a bulk ceria precursor with a liquid dispersion of an aluminum-stabilizer precursor, and calcining the impregnated ceria, gives improved thermal stability.

Furthermore, it is known that oxygen storage materials show higher resistance against sintering and a significant higher oxygen storage capacity when they are highly dispersed on the specific surface area of a thermally stable support oxide with a high surface area such as alumina.

The prior art discloses a composite oxide support and a process for its preparation based on alumina with at least one member of the group consisting of ceria, zirconia or ceria-zirconia. Additionally, the described composite oxide may contain barium or lanthanum.

To manufacture the composite oxide support according to the prior art, a solution of salts of a plurality of elements including at least one of cerium and zirconium, and aluminum, which define the composite oxide, is first mixed with an alkaline solution with the use of high speed mixing means to form a precursor of oxide composed of the plurality of elements. The precipitate is first dried and then calcined in air at 650° C. for 1 hour. To achieve a high mixing speed, a high rotating agitator is used. One substantial disadvantage of the described process is the use of alkaline hydroxides, which cannot be completely removed from the product.

The prior art also discloses a composite oxide and a process for its preparation consisting of an oxide of a metal $M_1$ of the group of Ce, Zr, alkali earth or rare earth metals in an amount of at least 50% per weight based on the total weight of the composite oxide, and an oxide of a metal $M_2$ of the group of Al, Ti or Si, whereas the metal oxide $M_2$ is not soluble in the oxide of metal $M_1$ and both metals are dispersed at the nanometer level. The oxides of the metals $M_1$ or $M_2$ additionally may contain a further oxide of a metal $M_3$ of the group of Zr, alkaline earth or rare earth metal. The material is prepared by mixing suitable precursors of the metal oxides in the desired amount and precipitated by addition of an aqueous ammonia solution, dried and finally calcined.

Based on the current state of the art, there is still a need for an oxygen storage material containing ceria with a high specific surface area after thermal aging and an improved oxygen storage and release capacity under dynamic exhaust conditions.

SUMMARY OF THE INVENTION

The present invention provides a superior oxygen storage material obtained by forming a co-precipitate from cerium and of at least another metal $M^1$ and finally drying and calcining the co-precipitate to form mixed oxide particles from cerium and the another metal $M^1$ (Ce/$M^1$ mixed oxide particles). During co-precipitation the combined solutions of precursors from cerium and the other metals are vigorously mixed to avoid aggregation of the forming precipitated particles. During calcination in air the precipitated compounds are decomposed and transformed into the desired oxides.

Therefore, in a first aspect of the invention, an oxygen storage material comprising cerium oxide and at least one second oxide of a metal $M^1$ selected from the group consisting of alkaline earth metal, rare earth metal, zirconium, zinc, cobalt, copper and manganese wherein cerium oxide and the second metal oxide form Ce/$M^1$ mixed oxide particles is provided. This material shows an unprecedented high oxygen storage capacity and excellent dynamic properties with respect to oxygen storage and release compared to conventional materials.

The oxygen storage material of the first aspect of the invention can be further stabilized against thermal sintering by doping or coating with an additional oxide of a metal $M^2$, e.g. alumina, or any other thermally stable metal oxide.

Thus, in a second aspect of the invention an oxygen storage material is provided which comprises Ce/$M^1$/$M^2$ mixed oxide particles and in a third aspect of the invention an oxygen storage material is provided, which comprises the Ce/$M^1$ mixed oxide particles of the first aspect of the invention coated with an oxide of the additional metal $M^2$. In both cases the additional metal $M^2$ is selected from the group consisting of aluminum, magnesium, zirconium, silicium, titanium, gallium, indium, lanthanum and mixtures thereof.

In the following the oxygen storage capacity of the storage materials according to the invention is evaluated with the so-called Temperature Programmed Reduction with hydrogen ($H_2$-TPR). According to this evaluation method, a pre-oxidized sample is heated from room temperature to 1000° C. with a heating ramp of 10° C./min under a hydrogen containing atmosphere (5 vol.-% $H_2$, 95 vol.-% Argon or Nitrogen). The hydrogen, which is consumed by reaction with stored oxygen as a function of temperature, is used as an indication of the total oxygen storage capacity (OSC). The ignition temperature $T_{ign}$, where the hydrogen uptake starts and the temperature window, calculated from the half width of the TPR curve, can also be used for the evaluation of oxygen storage materials.

For a better understanding of the present invention together with other and further advantages and embodiments, reference is made to the following description taken in conjunction with the examples, the scope of which is set forth in the appended claims.

BRIEF DESCRIPTION OF THE DRAWINGS

Preferred embodiments of the invention have been chosen for purposes of illustration and description, but are not intended in any way to restrict the scope of the invention. The preferred embodiments of certain aspects of the invention are shown in the accompanying figures, wherein.

DETAILED DESCRIPTION OF THE INVENTION

The invention will now be described in connection with preferred embodiments. These embodiments are presented to aid in understanding of the present invention and are not intended to, and should not be construed to, limit the invention in any way. All alternatives, modifications and equivalents, which may become obvious to those of ordinary skill on reading the disclosure, are included within the spirit and scope of the present invention.

This disclosure is not a primer on oxygen storage materials, basic concepts known to those skilled in the art have not been set forth in detail.

The oxygen storage material of the present invention is based on mixed oxide particles of cerium and at least one second metal $M^1$ (Ce/$M^1$ particles in the following). In a preferred embodiment of the invention these mixed oxide particles form a single phase solid solution. Solid solution is an art recognized term and includes a homogenous solid that can exist over a range of component chemicals which are homogeneously mixed with one another on an atomicescale. A single phase exists when the solid exhibits only one crystallographic structure.

In a preferred embodiment of the invention, the material additionally comprises an oxide of a further metal $M^2$, which form an additional oxide component of the mixed oxide particles of the first aspect of the invention. In a most preferred embodiment of the invention the particles of the Ce/$M^1$ mixed oxide are coated with the oxide of the further metal $M^2$. This latter embodiment has been found to be particularly advantageous because it prevents the particles from sintering under high temperature load.

The metals $M^1$ are selected from the group consisting of alkaline earth metal, rare earth metal, zirconium, zinc, cobalt copper and manganese. The alkaline earth metals are group 2 metals on the periodic table of elements. The rare earth metals are elements 58 though 71 on the periodic table of elements. The preferred metals $M^1$ for forming the Ce/$M^1$ mixed oxide particles are calcium, zirconium, magnesium, lanthanum, praseodymium, neodymium, yttrium, cobalt, zinc, copper, manganese or mixtures thereof. The most preferred $M^1$ metals are calcium and zirconium. The metal $M^2$ of which the oxide can be present as an additional component of the Ce/$M^1$ mixed oxide to form Ce/$M^1$/$M^2$ mixed oxide particles is preferably selected from the group consisting of aluminum, silicium, titanium, gallium, indium and mixtures thereof.

In case the particles of the Ce/$M^1$ mixed oxide are coated with the oxide of metal $M^2$, metal $M^2$ may be selected from the group consisting of aluminum, magnesium, zirconium, silicium, titanium, gallium, indium, lanthanum and mixtures thereof. Thus, the oxygen storage material of the present invention may be constructed from e.g. Ce/Zr-mixed oxide particles coated with zirconium oxide to improve stability against sintering. The most preferred $M^2$ metal is aluminum. In another preferred embodiment of this invention, the oxide of metal $M^2$ is admixed with an oxide of a rare earth metal, preferably with lanthanum oxide.

The manufacturing procedure for the new oxygen storage material will be described further below. This procedure ensures that the Ce/$M^1$ or Ce/$M^1$/$M^2$ mixed oxides particles form solid solutions with crystallite diameters below 10 nm.

For ensuring a sufficient oxygen storage capacity of the material it is preferred that the Ce/$M^1$ mixed oxide particles contains more than about 50 but less than about 99 mol-% of cerium relative to the composition of the Ce/$M^1$ mixed oxide particles and the oxide of metal $M^2$ is present in an amount of about 1 to about 80 mol.-% relative to the total composition of the oxygen storage material. Such a material exhibits an exceptional high oxygen storage capacity measured by hydrogen uptake of at least about 0.9 mmol hydrogen per gram oxygen storage material. In addition, the temperature window of the $H_2$-TPR curve is wider than 120° C.

In one embodiment, the process for preparing the oxygen storage material of this invention comprises the following steps:
a) mixing an aqueous solution of a precursor of cerium with an aqueous solution of a precursor of an oxide of a metal $M^1$,
b) adding a first precipitation agent to this mixture, thereby forming an aqueous suspension containing the precipitate, and
c) separating the precipitate from the suspension and drying and calcining it.

Drying is done at elevated temperature between 50 and 180° C. for a period of 1 to 20 hours in air. After drying, the precipitated compounds are calcined in air at 350 to 500° C. for 1 to 10 hours, preferably at 400° C. for 4 hours. During calcination in air, the precipitated compounds are decomposed and transformed into the desired oxides. The resulting oxygen storage material is termed as the fresh material in the following.

The above process can be modified by adding a precursor of an oxide of a further metal $M^2$ to step a) to obtain an oxygen storage material according to the second aspect of the invention.

In another embodiment of the process before separating the precipitate from the aqueous suspension in step c) a precursor of an oxide of a further metal $M^2$ is added to the suspension and is deposited onto the precipitate by adding a second precipitation agent to obtain an oxygen storage material according to the third aspect of the invention.

Ammonium oxalate is used preferably as the first precipitation agent. Barium hydroxide is used as second precipitation agent for depositing $M^2$ on the surface of the Ce/$M^1$ particles.

Oxygen Storage Material Preparation

In the following, the process for the preparation of the oxygen storing material and its characteristics is described in detail.

Figure 1:
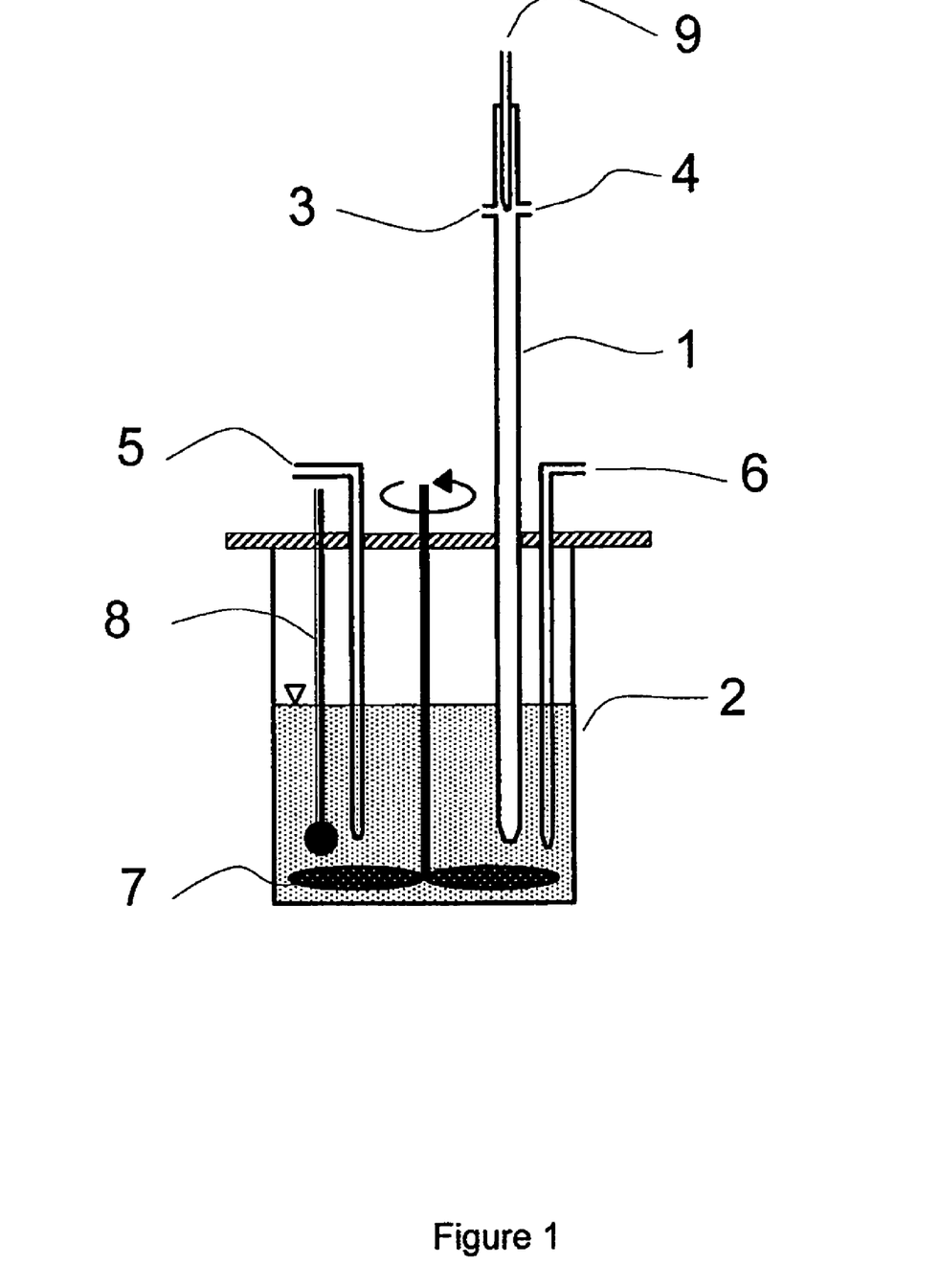
FIG. 1 illustrates the setup of the precipitation reactor.

As shown in FIG. 1, the oxygen storage material is prepared by a co-precipitation process in a specially designed synthesis reactor. The synthesis reactor comprises a precipitation reactor (1) and a hydrolysis reactor (2). The precipitation reactor is a tubular flow reactor for mixing a precursor solution of cerium and the additional metals with a precipitation agent and precipitating the metals in the form of small primary particles suspended in the liquid phase of the solution and the precipitation agent. The precursor solution is introduced into the tubular flow reactor at (3) and the precipitation solution at (4).

The two combined solutions form a precipitation mixture. Precipitation immediately starts after contact between the two solutions. Precipitation is completed after approximately 1 second. Thus, the residence time in the tubular flow reactor should not be smaller than 0.1 second—but on the other hand should not be extended over 5 to 10 seconds to prevent the formed primary particles from aggregating.

The quality and speed of mixing of the two components is essential for obtaining small precipitated particles. Therefore, additional means are provided for improving mixing of the components. It was found that bubbling nitrogen gas into the tubular flow reactor just below the liquid surface of the precipitation mixture gives good results with respect to particle size. In FIG. 1, nitrogen gas is introduced into the tubular flow reactor via gas feed (9). Instead of bubbling nitrogen into the precipitation mixture it is also possible to insert an ultrasonic transducer into the tubular flow reactor and enhance mixing of the two solutions by ultrasound. In general, it is advantageous to create a turbulent flow in the tubular flow reactor to increase mixing quality.

The precipitation mixture is introduced slowly from the tubular flow reactor into the hydrolysis reactor (2), where the precipitate is allowed to equilibrate for approximately one hour under intense mixing with mixer (7). It is important to note that the pH-value of the solution in the hydrolyzing reactor (2) should be held constant, because the equilibrium of the precipitation reaction is pH dependent. To achieve this, the pH-value is online monitored by a pH meter (8) and corrected by addition of basic or acidic solutions via feed (5). The resulting product is recovered by filtration, washed with deionized water and finally calcined for 4 hours in air at 400° C. to yield the freshly prepared oxygen storage material.

Feed (6) is provided for adding a precursor solution of at least one oxide of a further metal $M^2$, preferably alumina, to allow precipitating the precursor of $M^2$ onto the already precipitated particles. This leads to coating of the primary particles with the precipitate of metal $M^2$.

Figure 2:
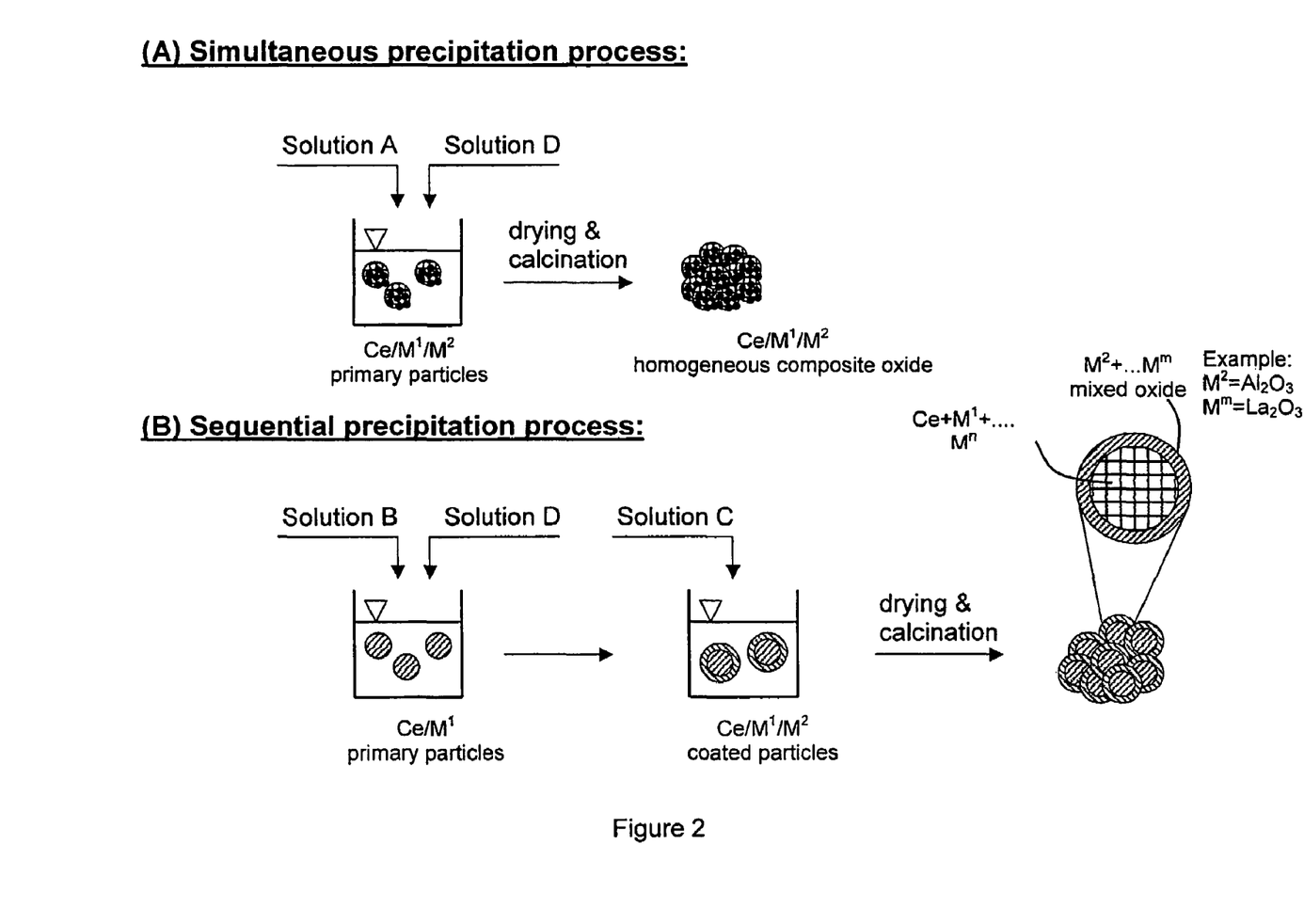
FIG. 2 illustrates the schematic build-up of simultaneous (A) and sequential (B) coating procedure.

The preparation process for the oxygen storage material according to the invention is now further explained with respect to FIG. 2.

FIG. 2 generally shows two procedures for preparing the oxygen storage material according to this invention. Process (A) is a simultaneous precipitation process for preparation of the oxygen storage materials according to first and second aspects of the invention while process (B) is a sequential precipitation process for preparation of the oxygen storage material according to the third aspect of this invention.

In order to prepare the oxygen storage materials according to the simultaneous precipitation process an aqueous solution A containing suitable precursors (e.g. nitrates) of cerium oxide and an aqueous solution D of a suitable precipitating agent (e.g. ammonium oxalate) are mixed in the desired molar ratio in a suitable mixing reactor (e.g. the tubular flow reactor (5) of the precipitation reactor (1) in FIG. 1). In the case of binary or multi metal oxides formulations of the $Ce_xMe^1{}_yMe''{}_{1-x-y}O_{2-\delta}$ type, the precursor solutions are premixed in a separate mixer before they come into contact with the precipitating solution D.

The precipitation leads to the formation of small primary particles Ce/$M^1$ or Ce/$M^1$/$M^2$ still containing the anions of the precipitation agent. The precipitated particles are separated from the liquid phase by filtration and are then dried and calcined to yield the desired oxygen storage material which in this case is a homogeneous composite oxide. During calcination the primary particles form larger aggregates.

Procedure (B) in FIG. 2 describes the sequential precipitation process to obtain an oxygen storage material according to the third aspect of this invention. The first preparation step is the same as for the simultaneous precipitation process. Contrary to the simultaneous precipitation process the precipitated primary particles are not separated from the precipitation mixture but a third precursor solution C is added containing the precursor of the oxide of metal $M^2$. This precursor is then precipitated onto the already formed primary particles of the first step by suitably adjusting the pH-value of the combined solutions.

Suitable precipitating agents D for the process according to this invention are any inorganic or organic chemicals, which react with precursor solution A to a poorly soluble precipitate. For example, hydroxides, carbonates, oxalates, tartrates, citrates of elements of group 1-3 of the periodic table or their corresponding free acids can be used. Alternatively, ammonium salts were used. Preferably, polydentate organic ligands such as oxalic acid or citric acid or their salts can be applied, which are working as a molecular spacer for the metal ions in the mixed metal oxide and lead to a high elemental homogeneity.

The best results were obtained when ammonium oxalate was used. Generally, the precipitation of doped cerium oxides with ammonium oxalate show some substantial advantages compared to other precipitating agents:

a) According to eq. (1), metal oxalates decompose solely into gaseous components like carbon dioxide without formation of residues like elemental carbon when it is exposed to elevated temperatures.

b) The oxalate ligand acts as an electron donator when it is decomposed into carbon dioxide (eq. 2a). This leads to a partly reduction of $Ce^{4+}$ to $Ce^{3+}$ and the formation of oxygen vacancies (2b).

c) Finally, the resulting mixed oxide exhibits a much more structured surface with wider pore diameters compared to commercial reference materials.

$$Ce_2(C_2O_4)_3(s) + \tfrac{1}{2} O_2(g) \longrightarrow 2CeO_2(s) + 3CO_2(g) + 3CO(g) \quad \text{eq. (1)}$$

$$C_2O_4^{2-} \longrightarrow 2CO_2 + 2e^- \quad \text{eq. (2a)}$$

$$2CeO_2 + 2e^- \longrightarrow Ce_2O_3 + \tfrac{1}{2}O_2 \quad \text{eq. (2b)}$$

To achieve a high degree of homogeneity of the material, vigorous mixing of the combined solutions is necessary.

The degree of homogeneity of the synthesized material can be determined by measuring the elemental distribution of the calcined product by electron dispersive spectroscopy (EDS) and is defined as the ratio of the standard deviation (sd) for each dopant over the average value (av). For instance, the homogeneity of Zr and Ce is the (sd/av) of the ratio Zr/(Ce+Zr) and Ce/(Ce+Zr), respectively.

The best results regarding homogeneity have been obtained when small bubbles of an inert gas (9) like nitrogen or argon were introduced into the tubular precipitation reactor (1), which provides a turbulent flow of the mixture. Alternatively, ultrasonic treatment during the precipitation process has been applied successfully. It is essential for obtaining small primary particles that the residence time in the turbulent flow reactor (1) is kept between about 0.1 and about 10, preferably between about 0.1 and about 5 and most preferably between about 1 and about 5 seconds before the mixture enters the hydrolyzation reactor (2).

In a preferred embodiment, the resulting materials contain more than about 50 and less than about 99 mol-% of ceria. The balance is formed by the oxide of metal $M^1$. Preferably, $M^1$ is either zirconium, calcium or mixtures thereof.

Typical specific BET-surface areas for the oxygen storage material of the invention range from about 50 to about 200 $m^2/g$ for the fresh material and mean particle size diameters from $d_{50}=0.5$ to about 1 μm (for comparison to commercial cerium/zirconium mixed oxides: $d_{50}=5$ to about 30 μm).

XRD measurements indicate the formation of a single phase solid solution with crystallite diameters below about 17 nm.

Figure 3:
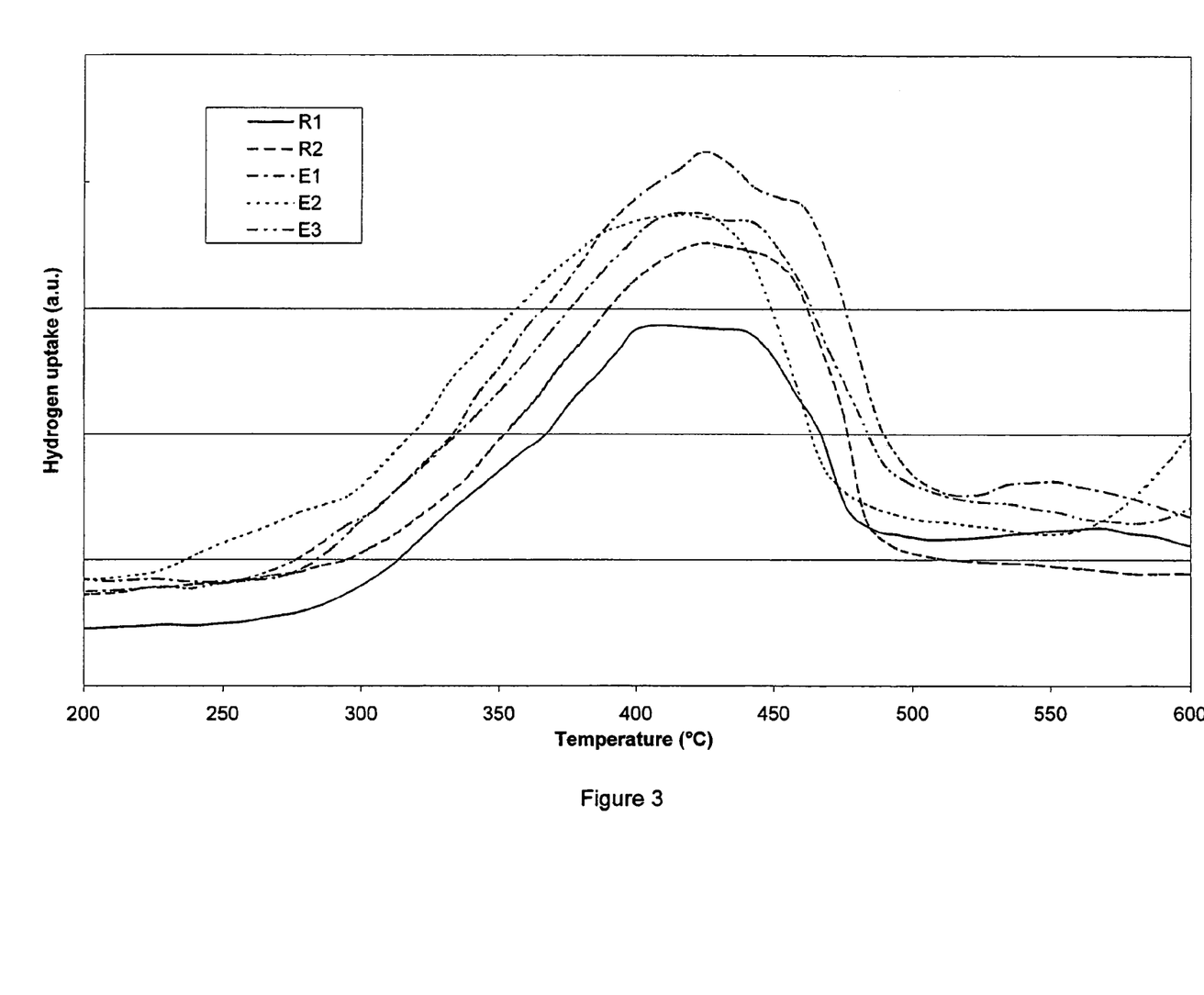
FIG. 3 illustrates the results of TPR-measurements of the materials E1-E3 in comparison to a commercial reference material (R1).

According to TPR measurements (FIG. 3), this material has a higher OSC compared to a commercial reference material with the same composition. The hydrogen uptake is found to be typically higher than 0.9 mmol $H_2$ per gram. In addition, a lower ignition temperature ($T_{ign}$) can be observed. The degree of inhomogeneity of the materials is generally below about 5%.

In order to improve both the oxygen storage capacity as well as temperature stability of the desired material, a precursor solution C of at least one oxide of a further metal $M^2$, preferably alumina, may be added in an amount of about 1 to about 80 mol-% before (eqs. 3a and 3b) or after the precipitation process (eq. 4b). In the first case, the oxide of metal $M^2$ is homogeneously distributed in the $Ce/M^1$ mixed oxide particles, whereas in the latter form the oxide of metal $M^2$ is heterogeneously deposited on the outer surface of the $Ce/M^1$ mixed oxide particles.

Simultaneous Precipitation Process:

eq. (3a)

eq. (3b)

Sequential Precipitation Process eq. (4a)

eq. (4b)

eq. (4c)

FIG. 2 shows the schematic build-up of these two processes.

Equations (3 a) and (3b) describe the simultaneous precipitation process (sim.) while equations (4a) to (4c) describe the sequential precipitation process (seq.). In these equations L signifies the ligand of a precursor, PA the precipitation-agent and A the anion of the precipitation agent. ΔT indicates treatment at elevated temperature during calcination.

For further improvement of thermal stability, one or more rare earth element oxides, preferably lanthanum oxide, in an amount of about 1 to about 60 mol-% may be admixed with the oxide of metal $M^2$ by adding to the precursor of the oxide of metal $M^2$ a precursor of e.g. lanthanum oxide.

When the precipitation process is conducted sequentially, the metal oxide $M^2O_x$ is deposited on the surface of the oxygen storage material in the form of a (mixed) hydroxide by addition of a suitable basic solution. A suitable basic compound can be any base such as ammonia, alkaline or alkaline earth hydroxides or tetraalkylammonium hydroxides. It is preferred to use alkaline metal free precipitation agents. Alkaline metals cannot be removed from the oxygen storage material during the calcination process. They would later on damage the honeycomb carriers coated with catalytic coatings comprising the oxygen storage material. It is therefore most preferred to use ammonia, tetraalkylammonium hydroxides or barium hydroxide as the precipitation agent.

Having now generally described the invention, the same may be more readily understood through reference to the following examples, which are provided by way of illustration and are not intended to limit the present invention unless specified.

EXAMPLES

The freshly prepared oxygen storage materials were used to determine the specific surface area ($S_{BET}$), crystallite diameter and inhomogeneity. Then, they were subjected to a TRP-measurement to determine the oxygen storage capacity, ignition temperature $T_{ign}$ and width of TPR-curve. The obtained data are listed in Table 1.

In addition, the materials were subjected to an aging treatment for 4 hours at 650° C. in air. After aging the specific surface area was determined a second time. Both surface areas, from the fresh and aged materials, are also listed in Table 1.

Reference Example R1

The oxygen storage material used as reference example R1 is a commercial $Ce_{0.63}/Zr_{0.37}$-mixed oxide calcined at 400° C. for 4 hours.

Reference Example R2

$CeO_2$

In this example a pure cerium oxide was produced according to the process of this invention for comparison purposes.

An aqueous solution of 1.0 mol/l cerium (III) nitrate hexahydrate and an aqueous solution of 0.3 mol/l ammonium oxalate in the desired molar ratio was pumped with constant flow rates into the tubular flow reactor. Turbulent flow was achieved by blowing nitrogen gas in the reactor in flow direction. The combined solutions were added slowly to the hydrolysis reactor under constant pH conditions (pH=4 to 5). The pH value was kept constant by adding the required amount of nitric acid or ammonia, respectively. The resulting precipitate was allowed to reach equilibrium with the hydrolyzing solution during one hour of stirring after which the precipitate was filtered off, washed twice with an aqueous solution of 0.01 mol/l oxalic acid, dried overnight in air at 120° C. and finally calcined in air for 4 hours at 400° C.

The composition and physicochemical characteristics of this pure cerium oxide are summarized in table 1. Catalytic test results are given in tables 3 and 4.

Example E1

$Ce_{0.9}Ca_{0.1}O_2$

An aqueous solution of 1.0 mol/l cerium (III) nitrate hexahydrate solution and 1.0 mol/l calcium tetra-nitrate solution were used instead of solely cerium (III) nitrate as in reference example R2. The procedure of Example R2 was followed.

The final product contained 90 at-% of cerium and 10 at-% of calcium. The characteristics of this powder are summarized in table 1.

Example E2

$Ce_{0.63}Zr_{0.37}O_2$

An aqueous solution of 1.0 mol/l cerium (III) nitrate hexahydrate solution and 1.0 mol/l zirconium nitrate solution were used instead of solely cerium (III) nitrate as in reference example R2. The further processing followed the procedure described in Example R2.

The final product contained 63 at-% of cerium and 37 at-% of zirconium. The characteristics of this powder are summarized in table 1.

Example E3

$Ce_{0.8}Zr_{0.2}O_2$

Example E2 was repeated with different molar ratios between cerium and zirconium. The final product contained 80 at-% of cerium and 20 at-% of zirconium. The characteristics of this powder are summarized in table 1.

Example E4

$Ce_{0.9}Ca_{0.1}O_2 \times 0.5\ Al_2O_3$, sim.

In this example an oxygen storage material comprising cerium, calcium and aluminum was prepared according to the simultaneous precipitation procedure described above.

To an aqueous solution of 1.0 mol/l cerium (III) nitrate hexahydrate, 1.0 mol/l calcium nitrate and 1.0 mol/l aluminum nitrate hexahydrate was added an aqueous solution of 0.3 mol/l ammonium oxalate. The combined solutions were added slowly to the hydrolysis reactor under constant pH conditions (pH=4 to 5). The pH value was kept constant by adding the required amount of nitric acid or ammonia, respectively. The resulting precipitate was allowed to reach equilibrium with the hydrolyzing solution during one hour of stirring after which the precipitate was filtered off, washed twice with an aqueous solution of 0.01 mol/l oxalic acid, dried overnight in air at 120° C. and finally calcined in air for 4 hours at 400° C.

The final product contained of 90 at-% of cerium and 10 at-% of calcium. The amount of alumina was 50 mol-% calculated on the basis of the molecular weight of the Ce/Ca mixed oxide. The characteristics of that powder are summarized in table 1.

Example E5

$Ce_{0.9}Ca_{0.1}O_2 \times 0.5\ Al_2O_3$, seq.

In this example an oxygen storage material comprising cerium, calcium and aluminum was prepared according to the sequential precipitation procedure described above.

To an aqueous solution of 1.0 mol/l cerium (III) nitrate hexahydrate, 1.0 mol/l calcium nitrate was added an aqueous solution of 0.3 mol/l ammonium oxalate. The resulting precipitation mixture was slowly added to the hydrolysis reactor and mixed for 60 minutes in the reactor at a pH value between 4 and 5. Subsequently an aqueous solution of 1.0 mol/l aluminum nitrate hexahydrate was added and the pH value was raised by addition of 25% aqueous ammonia solution up to pH=8 to 9. The precipitate was filtered off, washed twice with an aqueous solution of 0.01 mol/l oxalic acid, dried overnight in air at 120° C. and finally calcined in air for 4 hours at 400° C.

The final product contained 90 at-% of cerium and 10 at-% of calcium and 50 mol-% of alumina calculated on the basis of the weight of the Ce/Ca mixed oxide. The characteristics of that powder are summarized in table 1.

Example E6

$Ce_{0.8}Zr_{0.2}O_2 \times 0.2\ Al_2O_3$, seq.

Another oxygen storage material was prepared according to the sequential precipitation process by precipitating an aqueous solution of 1.0 mol/l cerium (III) nitrate hexahydrate solution, 1.0 mol/l zirconium nitrate with an aqueous solution of 0.3 mol/l ammonium oxalate. The suspension was further treated according to example E5.

The final product contained of 80 at-% of cerium, 20 at-% of zirconium and 20 mol-% of alumina calculated on the basis of the weight of the Ce/Zr mixed oxide. The characteristics of that powder are summarized in table 1.

Example E7

$Ce_{0.8}Zr_{0.2}O_2 \times 0.4\ Al_2O_3$, seq.

Another sample was prepared according to example E6.

The final product contained 80 at-% of cerium and 20 at-% of zirconium and 40 mol-% of alumina calculated on the basis of the weight of the Ce/Zr mixed oxide. The characteristics of that powder are summarized in table 1.

Example E8

$Ce_{0.8}Zr_{0.2}O_2 \times 0.4\ Al_2O_3 \times 0.03\ La_2O_3$, seq.

Instead of pure aluminum nitrate, a mixture of aluminum nitrate and lanthanum nitrate in a ratio of 97/3 calculated as the corresponding oxides was used in a process according to example E7.

The final product contained of 80 at-% of cerium, 20 at-% of zirconium, 40 mol-% of alumina and 3 mol-% lanthana calculated on the basis of the weight of the Ce/Zr mixed oxide. The characteristics of that powder are summarized in table 1.

Example E9

$Ce_{0.8}Zr_{0.2}O_2 \times 0.4\ Al_2O_3 \times 0.03\ La_2O_3$ seq., Ba

Sample according to example E8.

The alumina-lanthana mixed oxide was precipitated by addition of an aqueous solution of barium hydroxide. The final product contained 80 at-% of cerium, 20 at-% of zirconium for the Ce/Zr mixed oxide, 40 mol-% of alumina, 3 at-% lanthana calculated on the basis of the weight of the Ce/Zr mixed oxide. The characteristics of that powder are summarized in table 1.

Example E10

$Ce_{0.7}Zr_{0.2}Ca_{0.1}O_2 \times 0.2\ Al_2O_3$, seq.

Sample according to example E5.

An aqueous solution of 1.0 mol/l cerium (III) nitrate hexahydrate, 1.0 mol/l zirconium nitrate, 1.0 mol/l calcium nitrate was precipitated with an aqueous solution of 0.3 mol/l ammonium oxalate. The resulting suspension was further treated according to example E5.

The final product contained 70 at-% of cerium, 20 at-% of zirconium, 10 at-% of calcium and 20 mol-% of alumina calculated on the basis of the weight of the Ce/Zr mixed oxide. The characteristics of that powder are summarized in table 1.

The materials that had been synthesized according to this invention are listed in table 1 and 2. The data clearly indicates the advantageous effect of the described preparation process both on the specific surface area of the material and on the total OSC compared to a commercial reference material.

Figure 4:
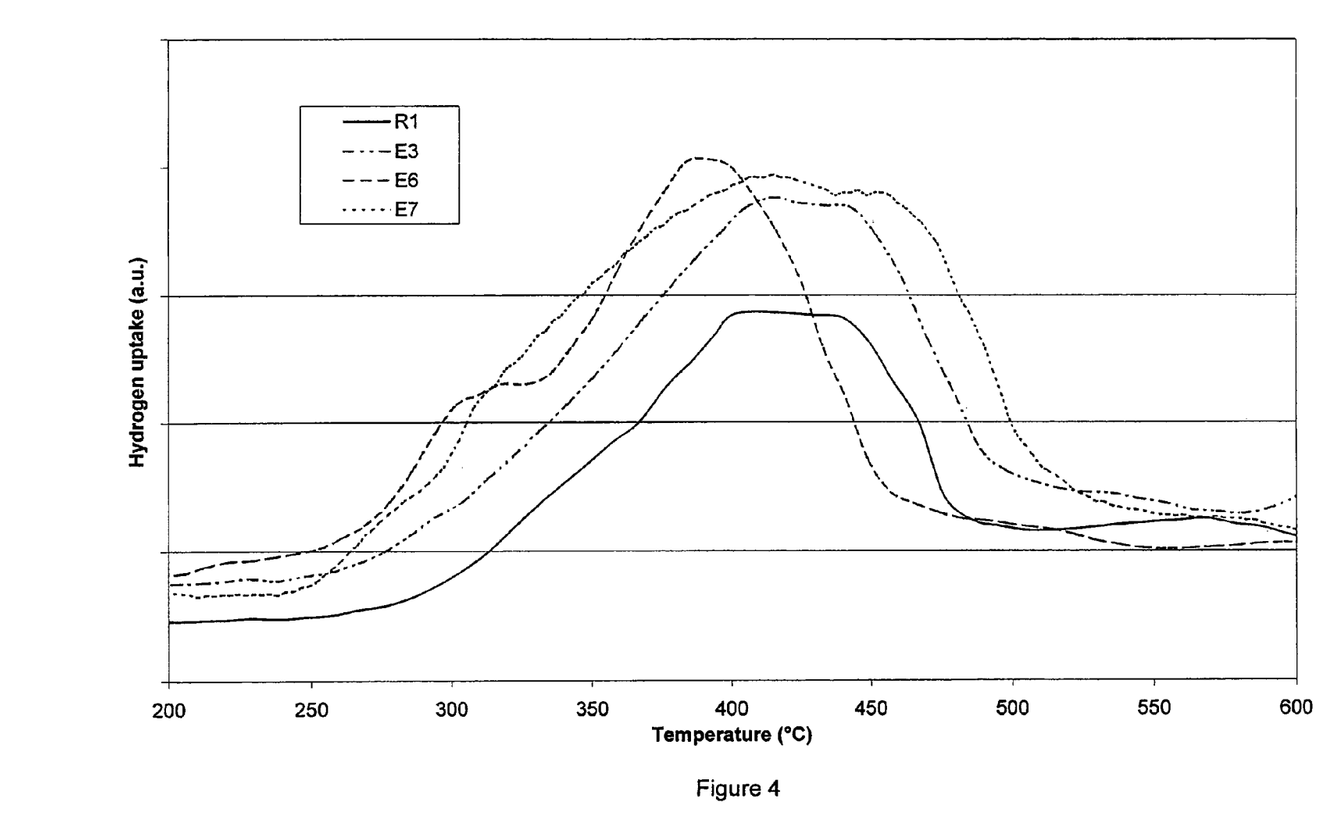
FIG. 4 illustrates the influence of coating amount of uncoated E3, coated E6 (20 mol-% $Al_2O_3$) and E7 (40 mol-% $Al_2O_3$) on total OSC in comparison to the reference material R1.
Figure 5:
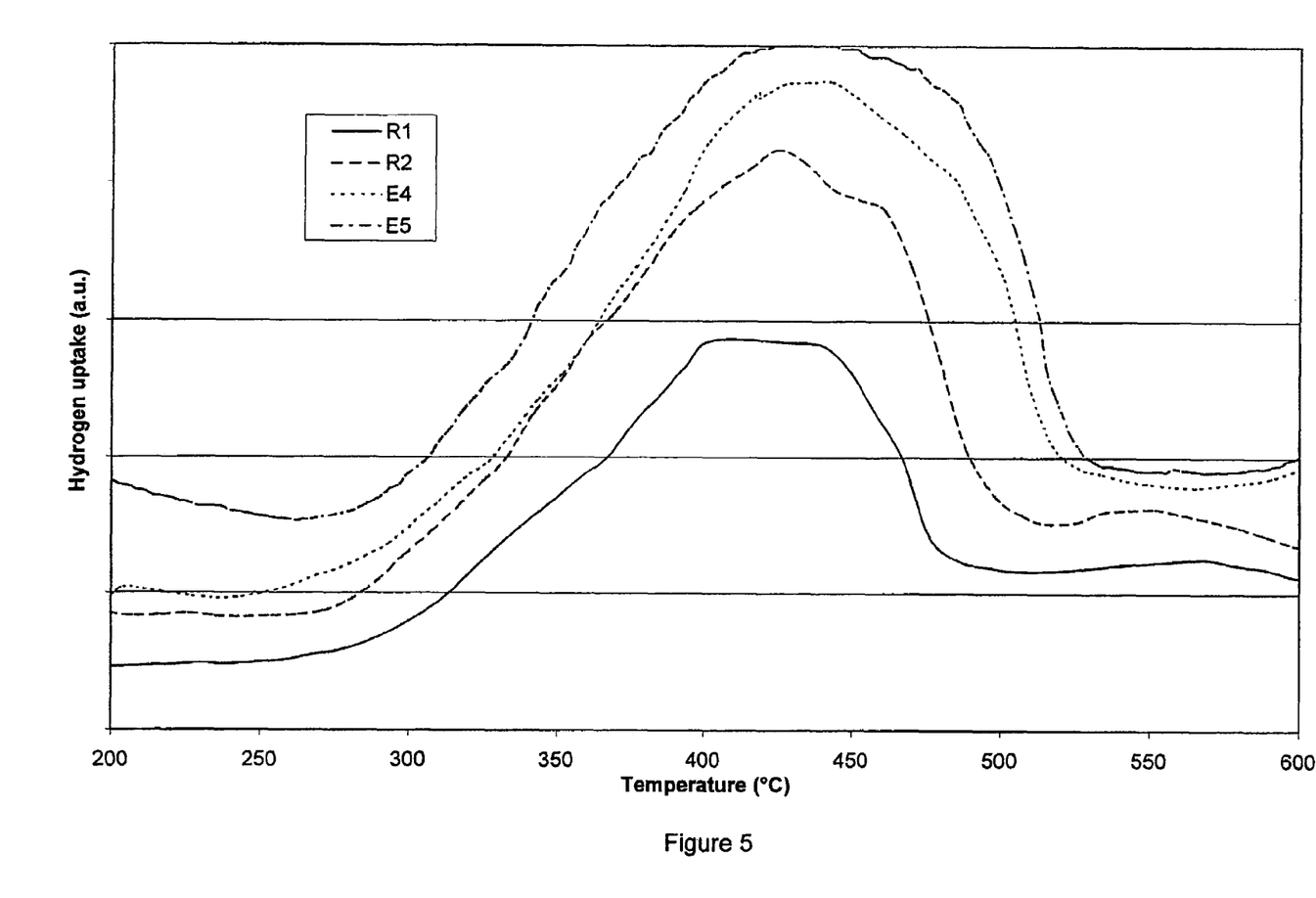
FIG. 5 illustrates the influence of the precipitation process (simultaneous or sequential) for materials E4 and E5 upon total OSC measured by TPR.

Additionally, the positive effect of coating of the doped cerium oxide by a further metal oxide, $M^2O_x$, especially when the coating process is performed sequentially (samples E5 to E10), can also be seen from FIGS. 4 and 5. The coating leads to a stabilization of the specific BET surface area, which prevents the primary particles from sintering at elevated temperatures. This can be illustrated by the lower crystallite sizes. Moreover, a much broader temperature window of the TPR profile is observed, which can be attributed to the highly porous surface of the coating, whereby the gaseous components have a good access to the active sites of the oxygen storage material.

TABLE 1

Chemical composition and physicochemical properties of fresh and calcined oxygen storage materials, their oxygen storage capacity (OSC), temperature window and temperature where hydrogen uptake begins ($T_{ign}$).

| Sample | Chemical composition [at-%] | $S_{BET}$ [m²/g] fresh | $S_{BET}$ [m²/g] aged | $d^{1)}$ [nm] | Inhomogeneity Sd/av [%] Ce | $M^1$ | $M^2$ | $OSC^{2)}$ [mmol/g] | $T_{ign}$ [° C.] | T-window[3)] |
|---|---|---|---|---|---|---|---|---|---|---|
| R1 | $Ce_{0.63}Zr_{0.37}O_2$ (commercial material) | 140 | 48 | 16 | 5.1 | 7.3 | — | 0.72 | 215 | 99 |
| R2 | $CeO_2$ | 104 | 19 | 8 | — | — | — | 0.97 | 200 | 117 |
| E1 | $Ce_{0.9}Ca_{0.1}O_2$ | 49 | 43 | 11 | 2.9 | 4.1 | — | 1.17 | 190 | 124 |
| E2 | $Ce_{0.63}Zr_{0.37}O_2$ | 58 | 41 | 12 | 1.3 | 2.4 | — | 1.4 | 140 | 126 |
| E3 | $Ce_{0.8}Zr_{0.2}O_2$ | 78 | 45 | 16 | 2.8 | 4.8 | — | 1.13 | 160 | 121 |
| E4 | $Ce_{0.9}Ca_{0.1}O_2 \times 0.5\ Al_2O_3$ (sim.) | 63 | 47 | 9 | 2.6 | 2.5 | 10.4 | 1.23 | 170 | 149 |
| E5 | $Ce_{0.9}Ca_{0.1}O_2 \times 0.5\ Al_2O_3$ (seq.) | 170 | 101 | 5 | 3.4 | 2.9 | 12.5 | 1.41 | 163 | 159 |
| E6 | $Ce_{0.8}Zr_{0.2}O_2 \times 0.2\ Al_2O_3$ (seq.) | 78 | 42 | 9 | 2.5 | 3.8 | 7.3 | 1.02 | 150 | 116 |
| E7 | $Ce_{0.8}Zr_{0.2}O_2 \times 0.4\ Al_2O_3$ (seq.) | 129 | 82 | 6 | 3.4 | 4.4 | 13.9 | 1.55 | 145 | 172 |
| E8 | $Ce_{0.8}Zr_{0.2}O_2 \times 0.4\ Al_2O_3 \times 0.03\ La_2O_3$ (seq.) | 125 | 93 | 6 | 2.9 | 3.8 | 12.7 | 1.61 | 140 | 175 |

TABLE 1-continued

Chemical composition and physicochemical properties of fresh and calcined oxygen storage materials, their oxygen storage capacity (OSC), temperature window and temperature where hydrogen uptake begins ($T_{ign}$).

| Sample | Chemical composition [at-%] | $S_{BET}$ [m²/g] fresh | $S_{BET}$ [m²/g] aged | d[1] [nm] | Inhomogeneity Sd/av [%] Ce | Inhomogeneity Sd/av [%] $M^1$ | Inhomogeneity Sd/av [%] $M^2$ | OSC[2] [mmol/g] | $T_{ign}$ [° C.] | T-window[3] |
|---|---|---|---|---|---|---|---|---|---|---|
| E9 | $Ce_{0.8}Zr_{0.2}O_2 \times 0.4\,Al_2O_3 \times 0.03\,La_2O_3$ (seq., Ba) | 119 | 88 | 7 | 4.0 | 4.2 | 9.6 | 1.44 | 139 | 181 |
| E10 | $Ce_{0.7}Zr_{0.2}Ca_{0.1}O_2 \times 0.2\,Al_2O_3$ (seq.) | 123 | 72 | 13 | 3.8 | 3.9 | 8.7 | 0.95 | 150 | 135 |

[1]crystallite size of fresh material
[2]OSC = oxygen storage capacity calculated from $H_2$ uptake of fresh material
[3]temperature window of TPR calculated as temperature corresponding to half width of the TPR curve.

Catalyst Preparation:

In the following catalysts were prepared and tested with respect to their light-off temperatures and CO/NOx crossover conversions.

The light-off temperature $T_{50}$ for a certain pollutant is the exhaust gas temperature at which the respective pollutant is converted by 50%. The light-off temperature may be different for different pollutants.

The so-called CO/NOx crossover conversion is determined by changing the lambda value of the exhaust gas from a value below 1 to a value above 1 or vice versa. At lambda values below 1 NOx conversion (reduction to nitrogen) is high while CO conversion (oxidation to carbon dioxide) is low. With increasing lambda value conversion of NOx drops and conversion of CO increases. The conversion at the point of intersection is the CO/NOx crossover conversion. The CO/NOx crossover conversion is the highest conversion, which can be achieved simultaneously for CO and NOx. The higher this crossover conversion the better is the dynamic behavior of the catalyst.

The catalysts were prepared by coating conventional honeycomb carriers made of cordierite 62 cm⁻²/0.17 mm (400 cpsi/6.5 mil) with catalytically active coatings containing several types of ceria/zirconia based mixed oxides according to table 1 and tested with respect to catalytic activity. The catalysts according to this invention were prepared by using the following raw materials:

La/Al$_2$O$_3$: γ-alumina, stabilized with 3 wt.-% lanthanum, calculated as lanthanum oxide, specific surface area as delivered: 140 m²/g; mean particle size: $d_{50} \approx 15$ μm;

Oxygen storage materials: see table 1

BaO: Barium oxide, technical purity

Pd(NO$_3$)$_2$: Palladium nitrate

Rh(NO$_3$)$_3$: Rhodium nitrate

Catalyst Carrier: cordierite; 62 cm⁻²/0.17 mm (400 cpsi/6.5 mil); volume: 0.618 l Catalyst Reference Example RC1

La-stabilized γ-Al$_2$O$_3$, oxygen storage material R1 and BaO in the weight ratio of 6:6:1 were mixed in deionized water to obtain a dispersion with a solid content of 45 wt.-%. The suspension was milled to a mean particle size of 2 to 3 μm.

A ceramic honeycomb carrier was dipped into this suspension to give a homogeneous coating with the desired washcoat loading, dried in air for 1 h at 120° C. and finally calcined in air for 2 h at 500° C. Subsequently, the catalytic coating was impregnated with a solution of palladium nitrate, dried once again and calcined. The complete layer contained the following amount of washcoat components:

La/Al$_2$O$_3$: 60 g/l
Ce$_{0.63}$Zr$_{0.37}$O$_2$(R1): 60 g/l } + 2.12 g/l Pd (corresponding to 60 g/ft³)
BaO: 10 g/l This catalyst will be denoted in the following as RC1. All other catalysts listed in table 3 and 4 are denoted as RC2 and C1 to C10. Instead of oxygen storage material R1 these catalysts contain the storage materials R2 and E1 to E10 with the same weight proportions as in catalyst RC1.

Catalytic Testing:

Prior to catalytic testing the described catalysts have been aged under hydrothermal conditions at 985° C. for 16 hours in an atmosphere containing 10 vol.-% water, 10 vol.-% oxygen and 80 vol.-% nitrogen. Catalytic tests have been run with cylindrical shaped cores (diameter: 25.4 mm; length: 76.2 mm) in a model gas test bench. As an indication for catalytic activity, light-off tests under synthetic model gas conditions (see table 2) have been made. The catalysts were heated up from room temperature to 500° C. with a temperature ramp of 15° C./min and with a space velocity of 225,000 h⁻¹. The lambda value of the exhaust gas was λ=0.99 with a modulation frequency of 1 Hz and an amplitude of ±0.8 A/F. The results of these measurements can be seen from table 3.

The composition of the model exhaust gas is given in table 2 and the results of catalytic test are represented in table 3.

TABLE 2

Composition of model exhaust gas.

| Component | Concentration |
|---|---|
| CO | 0.7 vol.-% |
| H$_2$ | 0.23 vol.-% |
| O$_2$ | 0.65 vol.-% |
| C$_3$H$_6$ | 666 ppm |
| C$_3$H$_8$ | 333 ppm |
| NOx (NO) | 0.2 vol.-% |
| CO$_2$ | 13 vol.-% |
| SO$_2$ | 20 ppm |
| H$_2$O | 10 vol.-% |
| N$_2$ | remaining |

TABLE 3

Light-off temperatures ($T_{50}$) of tested catalysts.

| Catalyst | CO $T_{50}$ [° C.] | HC $T_{50}$ [° C.] | $NO_x$ $T_{50}$ [° C.] |
|---|---|---|---|
| RC1 | 283 | 289 | 282 |
| RC2 | 302 | 314 | 307 |
| C1 | 274 | 282 | 270 |
| C2 | 273 | 282 | 275 |
| C3 | 294 | 301 | 292 |
| C4 | 269 | 278 | 271 |
| C5 | 267 | 272 | 270 |
| C6 | 272 | 281 | 273 |
| C7 | 268 | 276 | 264 |
| C8 | 265 | 275 | 263 |
| C9 | 261 | 271 | 262 |
| C10 | 265 | 275 | 264 |

After measuring the light-off temperatures of the catalysts the CO/NOx crossover conversions were determined. For that purpose, the lambda-value was continuously raised from 0.99 to 1.01 at two different temperatures (400° C. and 450° C.) and with a space velocity of 225,000 h$^{-1}$. During this change of the lambda-value the NOx-conversion drops from a high conversion rate to a low conversion rate while the conversion of CO behaves oppositely. The conversion value at the crossover point is the CO/NOx crossover conversion.

The CO/NOx-crossover conversions and the corresponding hydrocarbon conversion at the given temperatures are listed in table 4.

TABLE 4

CO/NOx crossover conversions (%) of the tested catalysts at a space velocity of 225,000 h$^{-1}$ and λ = 0.99; 1 Hz ± 0.8 A/F

| | T = 400° C. | | T = 450° C. | |
|---|---|---|---|---|
| Catalyst | CO/NOx [%] | HC [%] | CO/NOx [%] | HC [%] |
| RC1 | 63 | 81 | 77 | 80 |
| RC2 | 58 | 75 | 74 | 76 |
| C1 | 65 | 80 | 78 | 81 |
| C2 | 67 | 82 | 79 | 83 |
| C3 | 64 | 79 | 78 | 80 |
| C4 | 68 | 84 | 81 | 86 |
| C5 | 67 | 82 | 80 | 85 |
| C6 | 68 | 85 | 79 | 82 |
| C7 | 71 | 89 | 85 | 88 |
| C8 | 72 | 89 | 87 | 88 |
| C9 | 73 | 89 | 88 | 90 |
| C10 | 65 | 84 | 79 | 80 |

The light-off temperatures of the described catalysts represented by the $T_{50}$ values are shown in Table 3. The $T_{50}$ values correspond to the temperatures where 50% of the pollutants are converted. The light-off temperatures of the catalysts containing the oxygen storage materials of the present invention are considerably lower compared to the reference catalyst RC1, especially when alumina-coated materials were chosen. The best results have been obtained with the catalyst C9. This clearly demonstrates the more dynamic feature of the catalysts according to this invention. The CO/NOx crossover values given in table 4, support this finding.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with the known or customary practice within the art to which the invention pertains and as may be applied to the essential features herein before set forth and as follows in the scope of the appended claims.

What is claimed:

1. A process for producing an oxygen storage material comprising cerium oxide and at least one second oxide of a metal $M^1$, the process comprising the steps of:
    a) mixing an aqueous solution of a cerium oxide precursor with an aqueous solution of a precursor of an oxide of a metal $M^1$ selected from the group consisting of an alkaline earth metal, rare earth metal, zirconium, zinc, cobalt, copper and manganese to form a mixture;
    b) adding a first precipitation agent to the mixture, to form an aqueous suspension containing a precipitate, wherein the cerium oxide and the oxide of the metal $M^1$ form Ce/$M^1$ mixed oxide solid solution particles, and adding to the suspension: (i) a precursor of an oxide of a metal $M^2$ and (ii) barium hydroxide as a second precipitation agent to deposit $M^2$ on Ce/$M^1$ mixed oxide solid solution particles: and
    c) separating the precipitate from the suspension, drying and calcining the precipitate.

2. The process according to claim 1, wherein ammonium is used as the first precipitation agent.

3. The process as defined according to claim 1, wherein mixing in step a) is performed in a tubular flow reactor by bubbling gaseous nitrogen into the reactor.

4. The process according to claim 1, wherein the precursor solutions cerium metal, $M^1$ and $M^2$ are mixed by microwave treament.

5. The process according to claim 1, wherein the precursor solutions containing cerium metal, $M^1$ and $M^2$ are mixed by ultrasonic treatment.

6. A process for producing an oxygen storage material comprising cerium oxide and at least one second oxide of a metal $M^1$, the process comprising the steps of: a) mixing an aqueous solution of a cerium oxide precursor with an aqueous solution of a precursor of an oxide of a metal M selected from the group consisting of an alkaline earth metal, zirconium, zinc, cobalt, copper and manganese to form a mixture, wherein the mixing is performed in a tubular flow reactor by bubbling gaseous nitrogen into the reactor; b) adding a first precipitation agent to the mixture, to form an aqueous suspension containing a precipitate, wherein the cerium oxide and the oxide of the metal M1 form Ce/$M^1$ mixed oxide particles; and c) separating the precipitate from the suspension, drying and calcining the precipitate.

7. A process for producing an oxygen storage material comprising cerium oxide and at least one second oxide of a metal $M^1$, the process comprising the steps of: a) mixing an aqueous solution of a cerium oxide precursor with an aqueous solution of a precursor of an oxide of a metal $M^1$ selected from the group consisting of an alkaline earth metal, rare earth metal, zirconium, zinc, cobalt, copper and manganese to form a mixture, wherein a precursor of an oxide of another metal $M^2$ is added to form precursor solutions in the mixture and the mixing is achieved by microwave b) adding a first precipitation agent to the mixture, to form an aqueous suspension containing a precipitate, wherein the cerium oxide and the oxide of the metal $M^1$ form Ce/$M^1$ mixed oxide particles; and c) separating the precipitate from the suspension, drying and calcining the precipitate.

* * * * *